United States Patent
Chang (10) Patent No.: US 9,805,349 B1
(45) Date of Patent: Oct. 31, 2017

(54) METHOD AND SYSTEM FOR DELIVERING APPLICATION PACKAGES BASED ON USER DEMANDS

(71) Applicant: Hsuan-Yeh Chang, Chestnut Hill, MA (US)

(72) Inventor: Hsuan-Yeh Chang, Chestnut Hill, MA (US)

(*) Notice: Subject to any disclaimer, the term of this patent is extended or adjusted under 35 U.S.C. 154(b) by 873 days.

(21) Appl. No.: 13/865,217

(22) Filed: Apr. 18, 2013

Related U.S. Application Data (63) Continuation of application No. 11/944,456, filed on Nov. 22, 2007, now abandoned.

(51) Int. Cl.
*G06Q 20/12* (2012.01)

(52) U.S. Cl.
CPC ....... *G06Q 20/1235* (2013.01); *G06Q 20/123* (2013.01); *G06Q 20/127* (2013.01)

(58) Field of Classification Search
CPC ....... G06Q 20/00–20/425; G06Q 30/00–30/08
USPC .................................................. 705/1.1–500
See application file for complete search history.

(56) References Cited

U.S. PATENT DOCUMENTS

| | | | |
|---|---|---|---|
| 5,765,205 A | 6/1998 | Breslau et al. | |
| 5,790,753 A | 8/1998 | Krishnamoorthy et al. | |
| 6,311,221 B1 | 10/2001 | Raz et al. | |
| 6,546,547 B1 | 4/2003 | Runyan et al. | |
| 6,754,896 B2 | 6/2004 | Mishra et al. | |
| 6,826,546 B1 * | 11/2004 | Shuster | 705/52 |
| 6,854,009 B1 | 2/2005 | Hughes | |
| 6,918,113 B2 | 7/2005 | Patel et al. | |
| 6,954,852 B2 | 10/2005 | Burokas et al. | |
| 6,954,853 B2 | 10/2005 | Wang et al. | |
| 6,959,320 B2 | 10/2005 | Shah et al. | |
| 7,017,162 B2 | 3/2006 | Smith et al. | |
| 7,035,874 B1 | 4/2006 | Reed et al. | |
| 7,036,040 B2 | 4/2006 | Nicholson et al. | |
| 7,062,567 B2 | 6/2006 | Benitez et al. | |
| 7,072,950 B2 | 7/2006 | Toft | |
| 7,089,300 B1 | 8/2006 | Birse et al. | |
| 7,233,985 B2 | 6/2007 | Hahn et al. | |
| 7,281,068 B2 | 10/2007 | Davis et al. | |
| 7,321,936 B2 | 1/2008 | Zimmerman et al. | |
| 7,334,122 B2 | 2/2008 | Burokas et al. | |
| 7,356,679 B1 | 4/2008 | Le et al. | |

(Continued)

OTHER PUBLICATIONS

"Diskless Clients for Ubuntu," Linux Magazine, Issue 69, p. 12, Aug. 2006 (1 page).

(Continued)

*Primary Examiner* — Mohammad A. Nilforoush (57) ABSTRACT

A method and a system are provided for delivering on-demand software packages. In one aspect, the method may include subscribing services of a service provider operating a server, the server including an operating system and several application packages installed therein, initiating a client terminal by performing a network booting process using the operating system installed in the server, and executing in the client terminal a subscribed application package installed in the server using resources of the operating system resident in the client terminal. The method may further include charging the user a fee according to the application packages and the operating system subscribed by the user.

27 Claims, 3 Drawing Sheets

(56) References Cited

U.S. PATENT DOCUMENTS

| | | | |
|---|---|---|---|
| 7,451,196 B1 | 11/2008 | de Vries et al. | |
| 7,475,186 B2 | 1/2009 | Diehl | |
| 7,516,147 B2 | 4/2009 | Kranz et al. | |
| 7,664,834 B2* | 2/2010 | Keith, Jr. | 709/220 |
| 8,352,357 B2 | 1/2013 | Rotman et al. | |
| 8,543,899 B2* | 9/2013 | Jogand-Coulomb | 715/204 |
| 2001/0039546 A1 | 11/2001 | Moore et al. | |
| 2002/0083183 A1 | 6/2002 | Pujare et al. | |
| 2002/0087883 A1 | 7/2002 | Wohlgemuth et al. | |
| 2002/0157089 A1 | 10/2002 | Patel et al. | |
| 2002/0159089 A1 | 10/2002 | Patel et al. | |
| 2003/0004882 A1 | 1/2003 | Holler et al. | |
| 2003/0009538 A1 | 1/2003 | Shah et al. | |
| 2003/0120740 A1 | 6/2003 | Beeman et al. | |
| 2004/0153908 A1* | 8/2004 | Schiavone et al. | 714/712 |
| 2004/0163131 A1 | 8/2004 | Benco | |
| 2004/0260806 A1 | 12/2004 | Martin et al. | |
| 2005/0033850 A1 | 2/2005 | Kirkland | |
| 2005/0044433 A1 | 2/2005 | Dunstan | |
| 2005/0144431 A1 | 6/2005 | Lin et al. | |
| 2006/0013393 A1* | 1/2006 | Ferchichi et al. | 380/247 |
| 2006/0015931 A1 | 1/2006 | Davis et al. | |
| 2006/0031547 A1 | 2/2006 | Tsui et al. | |
| 2006/0048136 A1 | 3/2006 | Vries et al. | |
| 2006/0090069 A1 | 4/2006 | Burokas et al. | |
| 2006/0106770 A1 | 5/2006 | de Vries | |
| 2006/0123185 A1 | 6/2006 | de Vries et al. | |
| 2006/0136389 A1 | 6/2006 | Cover et al. | |
| 2006/0168294 A1 | 7/2006 | de Vries et al. | |
| 2006/0230175 A1 | 10/2006 | de Vries | |
| 2006/0294019 A1 | 12/2006 | Dayan et al. | |
| 2007/0112899 A1 | 5/2007 | Edwards et al. | |
| 2007/0208834 A1 | 9/2007 | Nanamura et al. | |
| 2008/0109876 A1 | 5/2008 | Hitomi et al. | |
| 2008/0319910 A1 | 12/2008 | Duffus et al. | |
| 2009/0119458 A1 | 5/2009 | de Vries et al. | |
| 2009/0119644 A1 | 5/2009 | de Vries et al. | |
| 2012/0303479 A1 | 11/2012 | Derks et al. | |

OTHER PUBLICATIONS

Frank Tuzi, "DRBL: A Quick and Easy Thin Client Server," http://www.linux.com/articles/57273, Oct. 2, 2006 (2 pages).

Danny Sabbah, "The Future of Software Delivery," White Paper, IBM Software Group, Feb. 2007 (28 pages).

Axel Schultze, "Channels for the New SaaS Industry," SIIA Software as a Service Executive Council Channel Committee White Paper, Mar. 2007 (15 pages).

Bert Armijo, "How Utility Computing Benefits SaaS," SIIA Software as a Service Executive Council Channel Committee White Paper, Apr. 2007 (9 pages).

Catherine Spence, "Software On-Demand—OS/Application Streaming Client Study," IT@Intel Technical Brief, 2008 (4 pages).

Catherine Spence et al., "Better Together: Rich Client PCs and Cloud Computing," IT@Intel Brief, Mar. 2009 (4 pages).

Catherine Spence et al., "Streaming and Virtual Hosted Desktop Study—Benchmarking Results," IT@Intel White Paper, Jan. 2008 (8 pages).

Catherine Spence et al., "Streaming and Virtual Hosted Desktop Study: Phase 2," IT@Intel White Paper, Apr. 2010 (8 pages).

Robert L. Mitchell, "Streaming the Desktop," ComputerWorld, Nov. 21, 2005 (4 pages).

Non-final Office Action dated Aug. 6, 2013 in co-pending U.S. Appl. No. 11/944,456 (46 pages).

* cited by examiner

METHOD AND SYSTEM FOR DELIVERING APPLICATION PACKAGES BASED ON USER DEMANDS

This is a continuation of U.S. application Ser. No. 11/944,456, entitled METHOD AND SYSTEM FOR DELIVERING APPLICATION PACKAGES BASED ON USER DEMANDS, filed on Nov. 22, 2007, the entire contents of which are incorporated herein by reference.

BACKGROUND

The present invention relates to a method and a system for delivering application packages. More particularly, the present invention relates to a method and a system for delivering application packages based on user demands.

In order to normally operate a data processor, such as a personal computer, it is often required that an operating system (OS) and some application packages operable under the OS be installed in the data processor. The OS may provide resources for operating the data processor and manage the sharing of the resources. The application packages may use the resources of the OS to perform specific tasks.

In certain cases, the data processor may be purchased including an OS and some basic application packages pre-installed in the data processor. The user of the data processor may then obtain a license for the OS and/or the application packages with or without additional fees. If the user wants the data processor to perform a special task and none of the pre-installed application packages can perform the task, the user will then need to purchase a special application package that performs the task and install the purchased special application package in the data processor before use.

Normally, the purchase of an application package means the purchase of a license which allows a user to use that application package on a single machine with an unlimited time period. However, the purchase of such a license may be very costly. Accordingly, many other types of licenses have been developed recently.

Among the recently developed licenses, an on-demand license has attracted much attention. The on-demand license allows the user to pay a fee only when the licensed application package is subscribed and/or used. The user will not need to pay anything if the application package is unsubscribed and/or not in use.

Currently, the on-demand license type is applicable mostly to web applications. However, running a web application, i.e., under a web browser, may be several times slower than running the application directly under an OS. Accordingly, there is a need to develop a method and a system that can more efficiently deliver application packages based on user demands.

SUMMARY

In light of the above, there is provided a method and a system for delivering application packages based on user demands.

In one embodiment, the method includes subscribing services of a service provider operating a server, the server including an operating system and a plurality of application packages installed therein, initiating a client terminal by performing a network booting process using the operating system installed in the server, and executing in the client terminal a subscribed application package installed in the server using resources of the operating system resident in the client terminal.

In another embodiment, the method includes initiating a client terminal using an operating system installed in a server situated in a communication network, the client terminal accessing the server via a service provider, providing, to the user, a list of application packages subscribed by the user, the application packages being installed in the server, selecting an application package from the list, running the selected application package on the client terminal using resources of the operating system, and charging the user a fee by the service provider according to the list of subscribed application packages.

DETAILED DESCRIPTION

Hereinafter, embodiments consistent with the present invention will be described in detail with reference to the accompanying drawings, in which like reference numerals refer to like elements.

Figure 1:
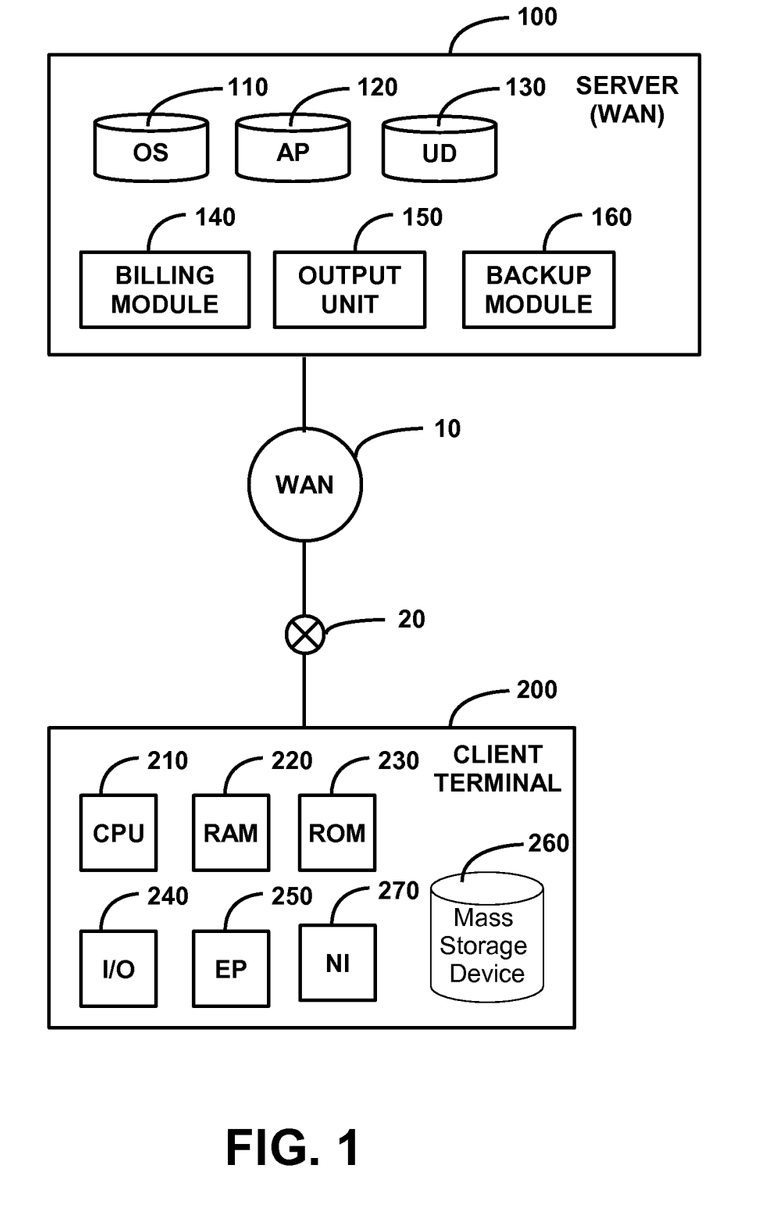
FIG. 1 illustrates a system for delivering application packages according to an embodiment consistent with the present invention.

Referring to FIG. 1, there is illustrated a system for delivering application packages according to an embodiment consistent with the present invention.

As shown in FIG. 1, a server 100, which may be operated and maintained by a service provider, is connected to a wide area network (WAN) 10. In one embodiment, server 100 may include an operating system (OS) server 110, an application package (AP) server 120, and a user data (UD) server 130. Although three different servers 110, 120, and 130 have been shown and described, it is to be understood that servers 110, 120, and 130 may be realized as one server, two servers, or three different servers. Further, server 100 may include a billing module 140 and an output unit 150.

OS server 110 may include one or more operating systems installed therein. In one embodiment, the installed operation systems may be open source operating systems, such as Linux, BSD, and the like, or proprietary operating systems, such as Windows® of Microsoft Corp., "Mac OS X" of Apple Inc., and the like.

AP server 120 may include a plurality of application packages installed therein. The application packages may be open source software packages, such as "OpenOffice.org," or proprietary software packages, such as "Office 2007" of Microsoft Corp.

UD server 130 may include a plurality of storage units. Each storage unit may correspond to a user account for storing data of the user. Each storage unit has a capacity quota. For example, the capacity quota may be 100 GB. In one embodiment, UD server 130 may include a plurality of hard disks, thereby forming a file system under Redundant Array of Independent Disks (RAID) architecture. Accordingly, storing user data in UD server 130 may be better secured than saving them in mass storage device 260, which does not normally employ a RAID architecture. In addition, to protect privacy of the user, the user data stored in UD server 130 may be encrypted.

A user may subscribe services provided by the service provider. The services may include licenses to use one or more of the operating systems and/or one or more application packages installed in server 100. The services may further include rights to use the storage unit of a certain capacity quota. Further, the services may include output services. The user who has subscribed the output services may utilize output unit 150 to output, for example, documents, pictures, and the like, or to prepare a recording medium, such as a CD, a DVD, and the like. In one embodiment, the output services for preparing the recording medium may be used to backup data files of the user. The service provider may then ship the documents, pictures, data CDs, data DVDs, and the like, to the user via courier. Billing module 140 may issue a bill to charge the user for the services the user subscribed and/or used.

Referring again to FIG. 1, a client terminal 200 may be connected to WAN 10 via an access point 20. In one embodiment, client terminal 200 may be a data processor, such as a personal computer, a personal digital assistant, and the like, a communication apparatus, such as a cell phone, a smart phone, and the like, or a consumer electronic product, such as a television set, a game box, and the like.

Client terminal 200 may include a central processing unit (CPU) 210, a random access memory (RAM) 220, a read only memory (ROM) 230, an input/output (I/O) unit 240, an extension port (EP) 250 (for example, a universal serial bus (USB) port, or a card reader), a mass storage device 260 (for example, a hard disk), and a network interface (NI) 270. In one embodiment, client terminal 200 may not require mass storage device 260. Client terminal 200 may be operated using UD server 130 as a substitute mass storage device, with or without mass storage device 260 in client terminal 200.

Access point 20 may be a wireless access point (for example, a wireless router, a base station, and the like), or a wired access point (for example, a cable/DSL modem, an optical modem, and the like). Client terminal 200 uses NI 270 to gain access to WAN 10 via access point 20, so as to communicate with server 100. In one embodiment, NI 270 may be a wired network card, such as an Ethernet card, or a wireless network card, such as a WiMAX or WiFi interface device, depending on the type of access point 20 used.

Figure 2:
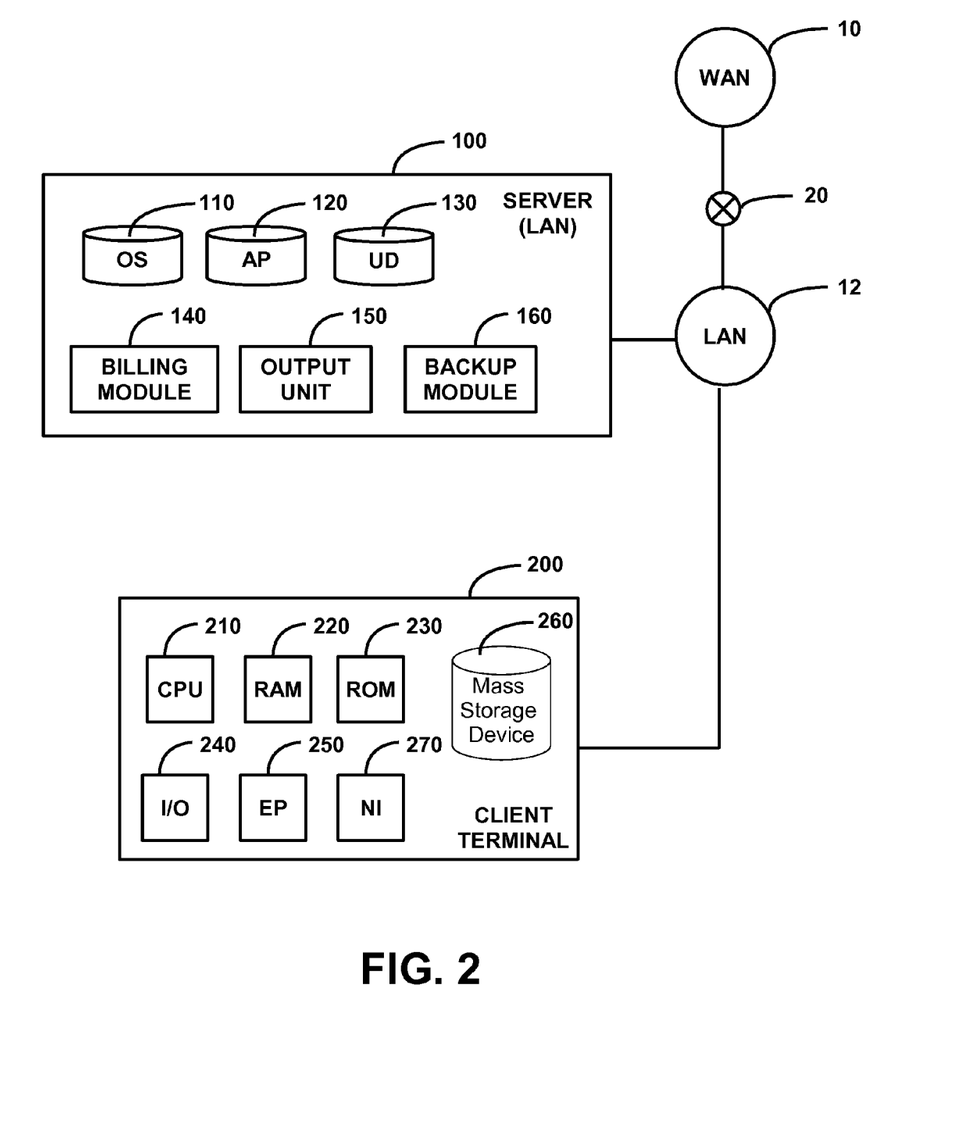
FIG. 2 illustrates a system for delivering application packages according to another embodiment consistent with the present invention.

Referring to FIG. 2, there is illustrated a system for delivering application packages according to another embodiment consistent with the present invention. As shown, a server 100 is connected to a local area network (LAN) 12. As discussed above, server 100 may include an operating system (OS) server 110, an application package (AP) server 120, and a user data (UD) server 130. In one embodiment, server 100 may be managed by the service provider. However, it is appreciated that server 100, which is connected to LAN 12, may be managed by the administrator of LAN 12, such as a corporate information technology (IT) department. The service provider provides licenses for a client terminal 200 to use the operating systems installed in OS server 110 and the application packages installed in AP server 120.

As shown in FIG. 2, client terminal 200 is connected to LAN 12. Client terminal 200 may use NI 270 to access server 100 via LAN 12. In one embodiment, LAN 12 may comprise Ethernet, and NI 270 may comprise an Ethernet card. However, it is to be understood that LAN 12 may comprise an Intranet, which may connect client terminal 200 and server 100 under the same domain but located at different geographical locations. Further, LAN 12 may be connected to WAN 10 via an access point 20.

Figure 3:
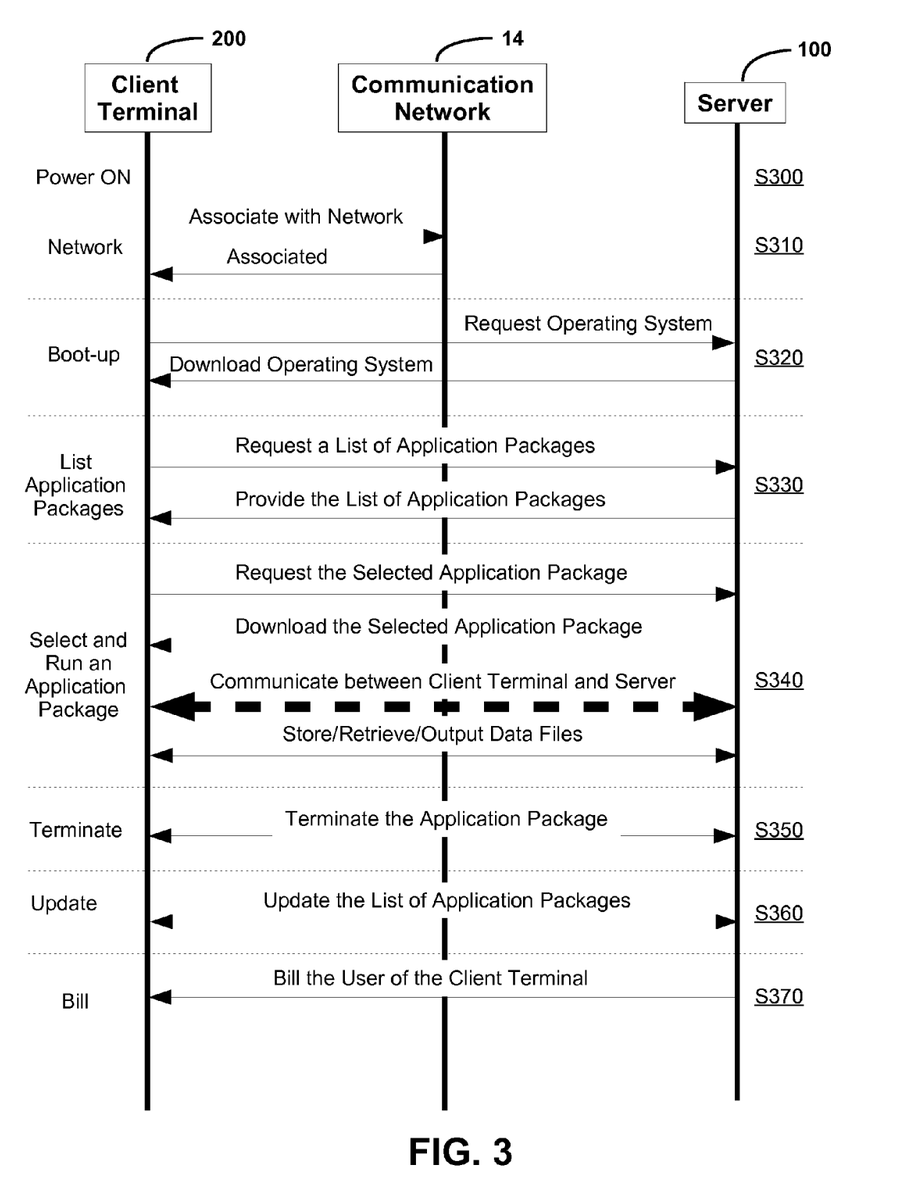
FIG. 3 illustrates a method for delivering application packages according to an embodiment consistent with the present invention.

Referring to FIG. 3, there is illustrated a method for delivering application packages according to an embodiment consistent with the present invention. Hereinafter, the method consistent with the present invention will be described in detail with reference to FIG. 3 as well as to FIGS. 1 and/or 2.

First, the user needs to obtain a client terminal and subscribe the services of the service provider. In one example, the user may already have a client terminal. Accordingly, the user only needs to subscribe the services without acquiring a new client terminal. In another example, the user may not already have a client terminal. Accordingly, the user needs to obtain a client terminal first. In certain cases, however, the service provide may provide a client terminal to the user when the user subscribes their services.

If the user does not yet have a client terminal and desires to subscribe the services, the user may visit a vendor store of the service provider located at, for example, a shopping center close to the user's neighborhood. The user may then subscribe the services using a client terminal of the vendor store. On the other hand, if the user already have a client terminal, the user may then visit a web store of the service provider, and subscribe the services of the service provider through the web store.

After the user subscribes the services, the service provider may then issue a user identification device, such as a SIM card, an IC card, a flash memory drive, a memory card, a CD-ROM, and the like, which may record subscription information of the user. The user identification device may be connected with client terminal 200 via EP 250. The subscription information may include user information, pass code, account information, subscription details, and/or system configurations of client terminal 200. In one embodiment, the user identification device may be integrated with ROM 230 of client terminal 200. For example, the subscription information may be recorded in ROM 230 of client terminal 200, if client terminal 200 is provided to the user by the service provider.

Referring to FIG. 3, in Step 300, the user powers on client terminal 200. Immediately after powering on client terminal 200, client terminal 200 may begin performing a network booting process.

In Step 310, client terminal 200 attempts to associate with a communication network 14 (for example, WAN 10 or LAN 12) by sending out a request to communication network 14. In one embodiment, communication network 14 may include a wireless communication network, which is accessible to client terminal 200 via a wireless access point, such as a base station. Once client terminal 200 is associated with communication network 14, client terminal 200 may have access to server 200. In one embodiment, client terminal 200 may be assigned a network address upon association with communication network 14. Alternatively, client terminal 200 may use a predetermined network address included in the subscription details recorded in the user identification device.

In Step 320, after client terminal 200 is associated with communication network 14, client terminal 200 may broadcast a request for finding server 100 that includes an operating system installed therein. In one embodiment, a server address of server 100 may be included in the subscription details recorded in the user identification device. In this case, client terminal 200 may find server 100 within a short time period. Once server 100 is found, client terminal 200 may begin a booting process (or initiating process) based on the subscription information by transferring from server 100 the operating system subscribed by the user. Before the booting process, however, server 100 may need to authenticate the user. In one embodiment, server 100 may authenticate the user by requesting, for example, the subscription information from client terminal 200. Because the operating system is installed in server 100, client terminal 200 does not require the operating system be installed in mass storage device 260 of client terminal 200. If client terminal 200 includes mass storage device 260, the user may then use the entire capacity of mass storage device 260 to store user data, without sacrificing storage space for the operating system.

The network booting process described above may be time consuming, especially when the bandwidth of communication network 14 is narrow. Accordingly, in one embodiment, client terminal 200 may further include a non-volatile memory module (not shown) having a storage capacity substantially the same as that of RAM 220. If the user wants to power off client terminal 200 to save energy, but does not want to spend time on the network booting process when powering on client terminal 200 again, dynamic data in RAM 220 of client terminal 200 may be transferred to the non-volatile memory when powering off, so as to allow client terminal 200 to enter a hibernation mode. When the user powers on client terminal 200 again, the dynamic data stored in the non-volatile memory module may be loaded back to RAM 220. In this manner, client terminal 200 may return to its original state of operation at the time the power is turned off. Accordingly, no reboot of client terminal 200 may be necessary. Essentially, client terminal 200 may need to go through this network booting process only when client terminal 200 is powered on for the first time. Nevertheless, client terminal 200 may still need to reboot when certain portions of the operating system go crashed and are unrecoverable.

In Step 330, after performing the network booting process, client terminal 200 may request server 100 to send a list of application packages installed in AP server 120. Server 100 may then provide the list of application packages to client terminal 200. According to the subscription information recorded in the user identification device, the user is licensed to use one or more application packages in the list. For those application packages not subscribed by the user, the user is not licensed to use them. Because the subscribed application packages are installed in server 100, client terminal 200 does not require the application packages be installed in mass storage device 260 of client terminal 200. Accordingly, if client terminal 200 includes mass storage device 260, the user may use the entire capacity of mass storage device 260 to store user data.

In Step S340, in order to execute or run a subscribed application package on client terminal 200, the user may select the subscribed application package from the list of application packages, and send a request for the selected application package to server 100. In one embodiment, server 100 may need to verify the user's subscription of the selected application package before activating the selected application package. Once the user's subscription is verified, client terminal 200 then begin transferring the selected application package and execute the selected application package on client terminal 200, using resources of the operating system resident in RAM 220 of client terminal 200.

While running the selected application package on client terminal 200, client terminal 200 may communicate with server 100, and vice versa, to obtain component parts or add-on modules of the selected application package from AP server of server 100, and/or to store temporary data into UD server 130 of server 100, for example. Further, while running the selected application package, the user of client terminal 200 may store a newly created data file into server 100 and/or retrieve a previously created data file from server 100. Moreover, the user may output a data file through output unit 150 of server 100. The service provider may then ship the output material, such as document papers, to the user via courier.

In Step S350, when the user is to terminate the execution of the selected application package, client terminal 200 may inform server 100 that the selected application package is to be terminated. Client terminal 200 may then release the running application package from RAM 220 of client terminal 200.

In Step S360, when the user wants to change his subscription of services, the user may use client terminal 200 to send a request for subscription update to server 100. In response, server 100 may send a list of application packages including currently subscribed application packages and available application packages not currently subscribed.

If the user wants to subscribe a new application package, the user may search for the new application package from the available application packages. The user may then select the new application package found from the available application packages. Further, the user may subscribe the new application package by updating the list of application packages, that is, by adding the new application package to the subscribed application packages.

If the user wants to unsubscribe a currently subscribed application package, the user may select the application package to be unsubscribed from the currently subscribed application packages. Further, the user may unsubscribe the selected application package by updating the list of application packages, that is, by removing the selected application package from the subscribed application packages.

Accordingly, application packages can be delivered to the user according to the user's demands. When the user demands an application package, the user may simply subscribe it from the service provider. On the other hand, when the user no longer demands a certain application package, the user may simply unsubscribe it. In one embodiment, the user may subscribe or unsubscribe the license of the application package on a daily basis, a weekly basis, a monthly basis, and the like. In this manner, the user only pays for the license of an application package when he subscribes and/or uses the application package. Thus, the user does not need to pay the large fee for purchasing the license of an application package as in the related art.

In Step S370, the service provider may charge the user a fee for the services that are subscribed. More specifically, billing module 140 of server 100 may issue a bill according to the user's subscription of the services of the service provider. In one embodiment, billing module 140 may issue a bill to the user periodically, such as monthly, weekly, and the like. In one embodiment, the bill may be sent to the user via an electronic mail.

In view of the above, the present invention may provide a system and a method for delivering application packages based on user demands. Unlike the delivery method of application packages in the related art, the present invention does not require the application packages be executed on top of a web browser. Rather, the application packages may be executed directly on a client terminal using resources of an operating system resident in the RAM of the client terminal. Accordingly, the performance of the application packages may be several times better than running the application packages over a web browser.

Further, because application packages may be executed directly on the client terminal, not on the server, the minimum system requirement of the server may be largely reduced. The server may fully dedicate to the management of the application packages and/or the operating systems without sharing computing time for execution of those application packages. Accordingly, the same server may support much more client terminals under the architecture of the present invention than under the architecture of the related art.

While embodiments consistent with the present invention have been described in detail, it is to be understood by those skilled in the art that various modifications and/or alterations may be made without departing from the spirit and scope of the appended claims. Accordingly, it is intended that the scope of the present invention be defined in the appended claims and their equivalents.

What is claimed is:

1. A method for providing software applications through a computer network based on user demands, the method comprising:
   accepting, through a web store, a subscription of one or more software application packages from a user;
   sending, to the user, a user identification module configured to control access of said one or more software application packages, and coupling the user identification module to a client terminal device of the user;
   a server device authenticating the user by requesting subscription information of the user from the user identification module through the computer network;
   upon authentication of the user, the server device providing, to the client terminal device of the user, a listing of one or more software application packages subscribed through the web store in accordance with the subscription information;
   the server device receiving, from the client terminal device and through the computer network, a selection of a first software application package from said listing of one or more software application packages;
   the server device transmitting the first software application package to the client terminal device through the computer network; and
   executing the first software application package by a processor of the client terminal device using resources of an operating system resident in a memory of the client terminal device.

2. The method of claim 1, further comprising:
   the server device receiving an update request from the client terminal device and updating said subscription of one or more software application packages in response to the update request by removing the first software application package from said listing of one or more software application packages; and
   providing to the client terminal device an updated listing of one or more software application packages in accordance with the updated subscription.

3. The method of claim 1, further comprising:
   the server device receiving an update request from the client terminal device and updating said subscription of one or more software application packages in response to the update request by adding a second software application package to said listing of one or more software application packages;
   the server device receiving, from the client terminal device and through the computer network, a selection of the second software application package from said updated listing of one or more software application packages;
   the server device transmitting the second software application package to the client terminal device through the computer network; and
   executing the second software application package by the processor of the client terminal device using the resources of the operating system resident in the memory of the client terminal device.

4. The method of claim 1, further comprising:
   accepting, through the web store, a subscription of the operating system installed in the server device; and
   initiating the client terminal device by transmitting the operating system to the client terminal device through the computer network so as to perform a booting process.

5. A method for providing software applications over a through a computer network based on user demands, the method comprising:
   accepting, through a web store, a subscription of one or more software application packages from a user;
   accepting, through the web store, a subscription of a storage unit remote from a client terminal device of the user;
   sending, to the user, a user identification module configured to control access of said one or more software application packages, and coupling the user identification module to the client terminal device;
   a server device authenticating the user by requesting subscription information of the user from the user identification module through the computer network;
   upon authentication of the user, the server device providing, to the client terminal device of the user, a listing of one or more software application packages subscribed through the web store in accordance with the subscription information;
   the server device receiving, from the client terminal device and through the computer network, a selection of a first software application package from said listing of one or more software application packages;
   the server device transmitting the first software application package to the client terminal device through the computer network;
   executing the first software application package by a processor of the client terminal device using resources of an operating system resident in a memory of the client terminal device; and
   while executing the first software application package on the client terminal device, saving in the remote storage unit a data file generated by the first software application package.

6. The method of claim 5, further comprising encrypting the data file saved in the remote storage unit.

7. The method of claim 1, wherein authenticating the user comprises requesting the subscription information including a pass code through the user identification module.

8. A method for providing software applications through a computer network based on user demands, the method comprising:
   accepting, through a web store, a subscription of one or more software application packages from a user;
   sending, to the user, a user identification module configured to control access of said one or more software application packages, and coupling the user identification module to a client terminal device of the user;

a server device authenticating the user by requesting subscription information of the user from the user identification module through the computer network;

upon authentication of the user, the server device providing, to the client terminal device of the user, a listing of one or more software application packages subscribed through the web store in accordance with the subscription information;

the server device receiving, from the client terminal device and through the computer network, a selection of a first software application package from said listing of one or more software application packages;

the server device transmitting the first software application package to the client terminal device through the computer network; and executing the first software application package by a processor of the client terminal device using resources of an operating system resident in a memory of the client terminal device;

wherein the method further comprises:

prior to executing the first software application package, the server device verifying a subscription status of the first software application package; and initiating said executing of the first software application package after the subscription status is verified.

9. The method of claim 1, wherein executing the first software application package comprises executing the first software application package by the processor without using a web browser application package.

10. The method of claim 1, further comprising accepting a payment from the user in accordance with said subscription of one or more software application packages.

11. The method of claim 10, wherein accepting the payment comprises accepting the payment periodically.

12. The method of claim 1, further comprising:

prior to powering off the client terminal device, hibernating the client terminal device by transferring dynamic data in the memory of the client terminal device to a non-volatile memory of the client terminal device; and powering off the client terminal device.

13. The method of claim 12, wherein hibernating the client terminal device comprises transferring the dynamic data in the memory to the non-volatile memory having a storage capacity same as that of the memory.

14. The method of claim 1, wherein executing the first software application package comprises:

executing the first software application package by the processor, while transmitting component parts of the first software application package to the client terminal device through the computer network.

15. The method of claim 1, wherein transmitting the first software application package comprises transmitting the first software application package through a wide area network.

16. The method of claim 1, wherein transmitting the first software application package comprises transmitting the first software application package through a wireless network.

17. The method of claim 1, further comprising searching for the first software application package among a plurality of available software application packages in the web store.

18. The method of claim 5, further comprising:

the server device receiving an update request from the client terminal device and updating said subscription of one or more software application packages in response to the update request by removing the first software application package from said listing of one or more software application packages; and providing to the client terminal device an updated listing of one or more software application packages in accordance with the updated subscription.

19. The method of claim 5, further comprising:

the server device receiving an update request from the client terminal device and updating said subscription of one or more software application packages in response to the update request from the client terminal device by adding a second software application package to said listing of one or more software application packages;

the server device receiving, from the client terminal device and through the computer network, a selection of the second software application package from said updated listing of one or more software application packages;

the server device transmitting the second software application package to the client terminal device through the computer network; and executing the second software application package by the processor of the client terminal device using the resources of the operating system resident in the memory of the client terminal device.

20. The method of claim 5, further comprising:

accepting, through the web store, a subscription of the operating system; and initiating the client terminal device by transmitting the operating system to the client terminal device through the computer network so as to perform a booting process.

21. The method of claim 5, wherein authenticating the user comprises requesting the subscription information including a pass code through the user identification module.

22. The method of claim 5, wherein executing the first software application package comprises:

executing the first software application package by the processor, while transmitting component parts of the first software application package to the client terminal device through the computer network.

23. The method of claim 8, further comprising:

the server device receiving an update request from the client terminal device and updating said subscription of one or more software application packages in response to the update request by removing the first software application package from said listing of one or more software application packages; and providing to the client terminal device an updated listing of one or more software application packages in accordance with the updated subscription.

24. The method of claim 8, further comprising:

the server device receiving an update request from the client terminal device and updating said subscription of one or more software application packages in response to the update request by adding a second software application package to said listing of one or more software application packages;

the server device receiving, from the client terminal device and through the computer network, a selection of the second software application package from said updated listing of one or more software application packages;

the server device transmitting the second software application package to the client terminal device through the computer network; and executing the second software application package by the processor of the client terminal device using the resources of the operating system resident in the memory of the client terminal device.

25. The method of claim 8, further comprising:
accepting, through the web store, a subscription of the operating system; and
initiating the client terminal device by transmitting the operating system to the client terminal device through the computer network so as to perform a booting process.

26. The method of claim 8, wherein authenticating the user comprises requesting the subscription information including a pass code through the user identification module.

27. The method of claim 8, wherein executing the first software application package comprises:
executing the first software application package by the processor, while transmitting component parts of the first software application package to the client terminal device through the computer network.

\* \* \* \* \*

(12) EX PARTE REEXAMINATION CERTIFICATE (11969th)
United States Patent
Chang

(10) Number: US 9,805,349 C1
(45) Certificate Issued: Dec. 27, 2021

(54) METHOD AND SYSTEM FOR DELIVERING APPLICATION PACKAGES BASED ON USER DEMANDS

(71) Applicant: Hsuan-Yeh Chang, Chestnut Hill, MA (US)

(72) Inventor: Hsuan-Yeh Chang, Chestnut Hill, MA (US)

(73) Assignee: Rain Computing, Inc.

Reexamination Request:
No. 90/014,539, Jun. 26, 2020

Reexamination Certificate for:
Patent No.: 9,805,349
Issued: Oct. 31, 2017
Appl. No.: 13/865,217
Filed: Apr. 18, 2013

Related U.S. Application Data

(63) Continuation of application No. 11/944,456, filed on Nov. 22, 2007, now abandoned.

(51) Int. Cl.
| | |
|---|---|
| *G06F 21/12* | (2013.01) |
| *G06F 8/60* | (2018.01) |
| *G06F 21/62* | (2013.01) |
| *G06Q 20/12* | (2012.01) |
| *G06Q 20/22* | (2012.01) |
| *H04L 12/24* | (2006.01) |
| *H04L 29/06* | (2006.01) |
| *H04L 29/08* | (2006.01) |

(52) U.S. Cl.
CPC .............. *G06F 21/121* (2013.01); *G06F 8/60* (2013.01); *G06F 21/629* (2013.01); *G06Q 20/123* (2013.01); *G06Q 20/127* (2013.01); *G06Q 20/1235* (2013.01); *G06Q 20/22* (2013.01); *H04L 41/20* (2013.01); *H04L 63/08* (2013.01); *G06F 2221/0713* (2013.01); *H04L 67/10* (2013.01)

(58) Field of Classification Search
None
See application file for complete search history.

(56) References Cited

To view the complete listing of prior art documents cited during the proceeding for Reexamination Control Number 90/014,539, please refer to the USPTO's public Patent Application Information Retrieval (PAIR) system under the Display References tab.

*Primary Examiner* — Cameron Saadat

(57) ABSTRACT

A method and a system are provided for delivering on-demand software packages. In one aspect, the method may include subscribing services of a service provider operating a server, the server including an operating system and several application packages installed therein, initiating a client terminal by performing a network booting process using the operating system installed in the server, and executing in the client terminal a subscribed application package installed in the server using resources of the operating system resident in the client terminal. The method may further include charging the user a fee according to the application packages and the operating system subscribed by the user.

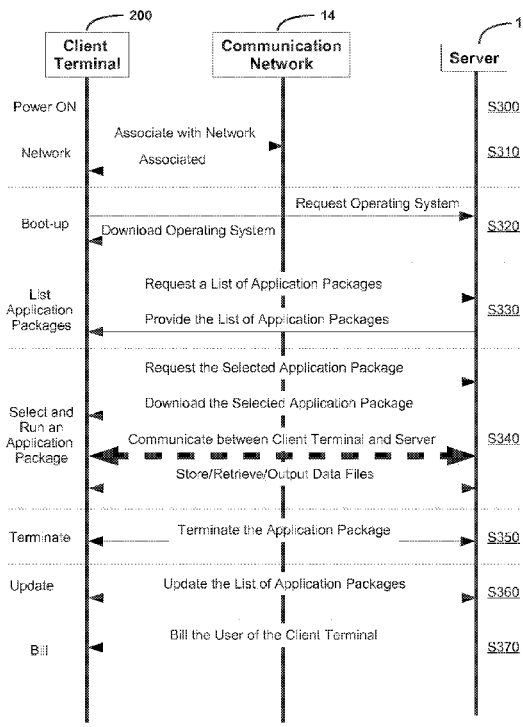

EX PARTE REEXAMINATION CERTIFICATE

THE PATENT IS HEREBY AMENDED AS INDICATED BELOW.

AS A RESULT OF REEXAMINATION, IT HAS BEEN DETERMINED THAT:

Claims 1-3, 5-11, 14-19, 21-24 and 26-27 are cancelled.
Claims 4, 12-13, 20 and 25 were not reexamined.

\* \* \* \* \*